(12) United States Patent
Freking et al.

(10) Patent No.: US 6,907,440 B2
(45) Date of Patent: Jun. 14, 2005

(54) SYSTOLIC CYLINDRICAL ARRAY MODULAR MULTIPLIER

(75) Inventors: William L. Freking, 2258 Timberlea Dr., Woodbury, MN (US) 55125-3001; Keshab K. Parhi, Mission Viejo, CA (US)

(73) Assignee: William L. Freking, Lexington, MA (US)

( * ) Notice: Subject to any disclaimer, the term of this patent is extended or adjusted under 35 U.S.C. 154(b) by 496 days.

(21) Appl. No.: 10/193,441

(22) Filed: Jul. 10, 2002

(65) Prior Publication Data

US 2004/0010535 A1 Jan. 15, 2004

(51) Int. Cl.$^7$ ................................................. G06F 7/72
(52) U.S. Cl. ..................................................... 708/491
(58) Field of Search ................................. 708/491, 492

(56) References Cited

U.S. PATENT DOCUMENTS

| | | | | |
|---|---|---|---|---|
| 5,101,431 A | * | 3/1992 | Even ............................. | 380/30 |
| 6,151,393 A | * | 11/2000 | Jeong .......................... | 380/265 |
| 6,763,365 B2 | * | 7/2004 | Chen et al. .................. | 708/491 |
| 6,804,696 B2 | * | 10/2004 | Chen et al. .................. | 708/491 |
| 2004/0010530 A1 | * | 1/2004 | Freking et al. ............. | 708/491 |

* cited by examiner

*Primary Examiner*—D. H. Malzahn

(57) ABSTRACT

A fast, scalable, systolic modular multiplier is presented. Linear throughput scalability with respect to consumed hardware resources is achieved through simultaneous parallel processing of multiple independent data streams. Optimal clock rates are attained by virtue of systolic properties of limited fan-out of all signal paths and nearest neighbor interconnections. Signal sharing among input and output busses and a common control interface for all independent data streams is made possible, thus benefiting integrated circuit implementations.

1 Claim, 1 Drawing Sheet

SYSTOLIC CYLINDRICAL ARRAY MODULAR MULTIPLIER

CROSS-REFERENCE TO RELATED APPLICATIONS

Not applicable.

BACKGROUND OF THE INVENTION

1. Field of the Invention

The present invention relates to the processing of digital signals to render modular multiplication.

2. Description of Related Art

Modular multiplication, which is the computation of A·B modulo M where A, B, and M are integer values, is a fundamental mathematical operation in applications based on number-theoretic arithmetic. A central application area is cryptography, where techniques such as the popular RSA and DSS methods utilize modular multiplication as the elemental computation. Since large word lengths on the order of thousands of bits are typically processed, hardware approaches to modular multiplication are typically very slow. Existing art attempts to address this deficiency through a handful of approaches.

Linear systolic array approaches dominate the art, with the article C. Walter, "Systolic modular multiplication," IEEE Transactions on Computers, v. 42, no. 3, pp. 376–378, 1993, being representative. In such an approach, a linear array of processing elements is connected so that all signal paths are formed between adjoining elements only. Thus, signal path lengths are minimized. Accordingly, all signal paths only connect two adjoining elements, guaranteeing unit fan out. The forgoing properties of systolic arrays ensure that the clock rate is determined solely by the processing element delay. However, efforts to scale the performance beyond the level offered by a single linear array have encountered very limited success. Cell optimization is the commonly applied technique to gain performance. However, performance scales only logarithmically with respect to consumed integrated circuit area.

Another method which attempts to provide a performance-area tradeoff is the digit-serial array. In the paper, J. Guo and C. Wang, "A novel digit-serial systolic array for modular multiplication," in Proc. of the 1998 IEEE International Symposium on Circuits and Systems, v. 2, pp. 177–180, 1998, a digit-serial modular multiplier methodology was presented. However, the arrays were not pipelined, and thus the clock period of the digit-serial cells grows proportionally with digit size. Therefore, performance scaling occurs in a sub-linear fashion for small digit sizes and quickly saturates to yield negligible performance gains for large digit sizes.

A non-systolic array was presented in the article H. Orup, "Simplifying quotient digit determination in high-radix modular multiplication," in Proc. of the 12th Symposium on Computer Arithmetic, pp. 193–199, 1995. A roughly linear performance-area tradeoff was achieved through retiming of the modular correction loop within the modular multiplication algorithm. However, the clock rate is severely limited by the required fill-word-length signal broadcasts of the modular correction selection bit. Thus, the fan out of the aforementioned signal is the complete word length. Implementational efforts to increase the signal drive through transistor sizing destroys the linear performance-area trade off and only provide minor mitigation of the slow-clock-rate obstacle plaguing this methodology.

SUMMARY OF THE INVENTION

The present invention describes a method for parallel modular multiplication capable of processing multiple independent data streams simultaneously.

An implementation realizing this method consists of a multi-row array of processing elements having a column count equivalent to the modular multiplication word length. Each processing element accepts and generates bit-level data and performs partial product formation, modular correction formation, and summation of these generated bits with the right-single-bit-shifted result of the previous algorithmic iteration. The number of rows of the array is determined in accordance with the available integrated circuit implementation area and the desired throughput performance, which scales linearly with row count.

The data stream capacity and operational throughput are directly scalable with the available integrated circuit implementation area. This performance scalability is accomplished while maintaining a systolic paradigm, such that all interconnection paths are locally connected to neighboring processing elements and entail minimal fan out. Thus, the achievable clock rate is maximized and is dictated by the processing element delay rather than by long interconnect paths or loading due to multiple-gate fan out. Moreover, in contrast to isolated parallel modular multiplication arrays, the unified array structure of the present invention incorporates single input and output data buses, thereby reducing global integrated circuit wiring overhead. Additionally, the unified array permits a single controller to be utilized when the modular multiplier is utilized as a component in a higher-level functional unit such as a modular exponentiator.

Objects and Advantages of the Invention

The primary object of this invention is fast parallel processing of modular multiplication.

It is an advantage of this invention that multiple independent data streams may be simultaneously processed. The number of data streams is arbitrary, limited only by implementation area.

It is a primary advantage of this method that throughput performance scales linearly with the area of the integrated circuit implementation while maintaining the optimal systolic clock rate. The latter is attained through guaranteeing properties of purely nearest neighbor interconnections between processing elements and unit signal fan out.

It is an advantage of this invention that input and output data share signal lines such that the number of internal signal buses in an integrated circuit implementation are reduced.

It is an advantage of this invention that a unified control unit may be utilized when the modular multiplier unit is used in a modular exponentiator.

DETAILED DESCRIPTION OF PREFERRED EMBODIMENTS

Figure 1:
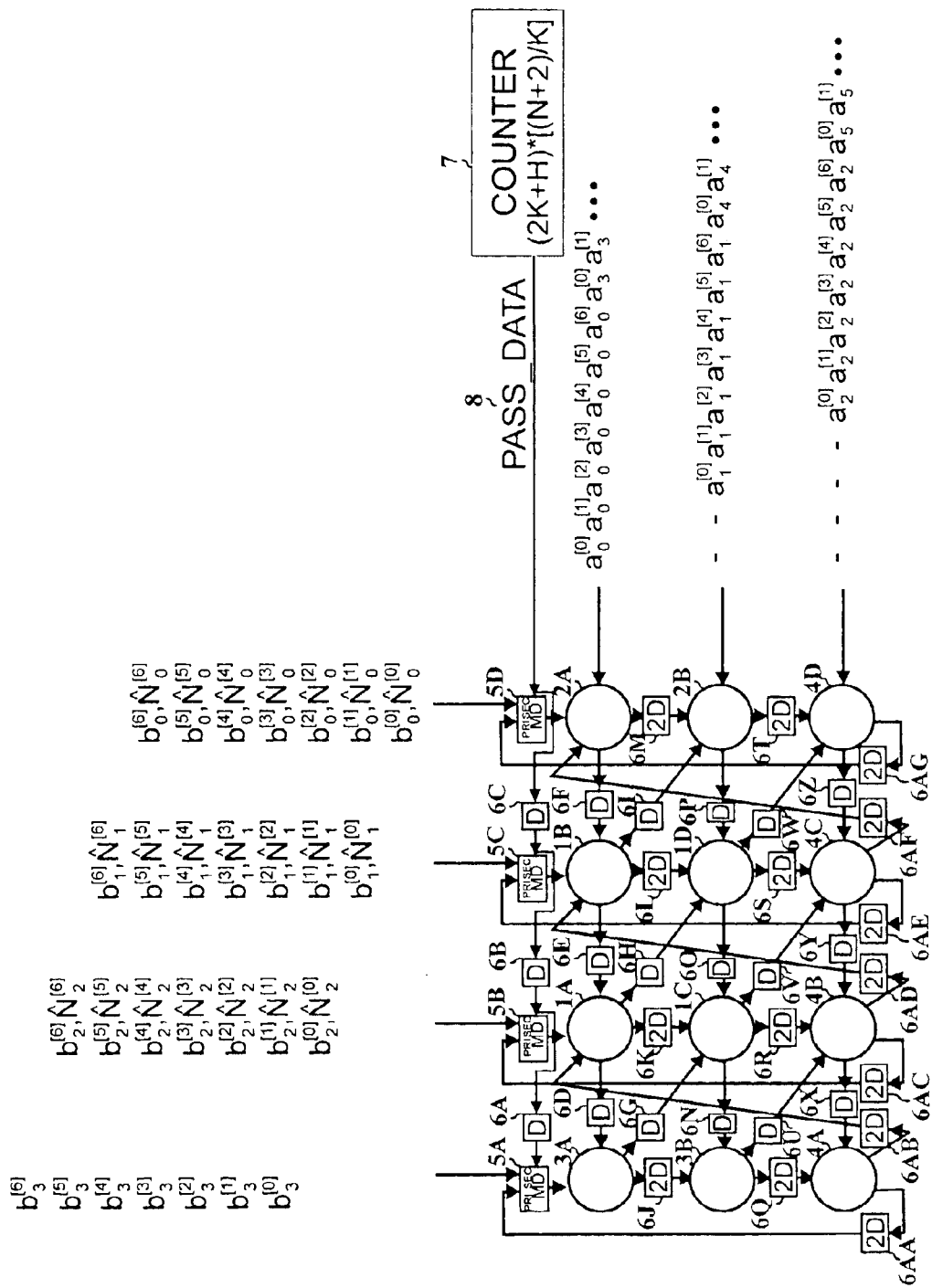
FIG. 1 illustrates the modular multiplier with its connections

The preferred embodiment is an array consisting of K rows and N+1 columns of bit-wise processing cells, where N represents the word length of the modulus value in bits and K is an integer parameter with value greater than one chosen according to the amount of integrated circuit area available for the implementation. The value of K directly relates to the amount of parallelism implemented in the array.

Each cell possesses a set of bit-wise inputs corresponding to the multiplicand, multiplier, modular correction, modular selection, partial sum, and two previous carry signals. Each cell also possesses a set of bit-wise outputs corresponding to the multiplicand, multiplier, modular correction, modular selection, generated partial sum, and two generated carry signals. Each inner cell 1, excluding the leftmost, rightmost, and bottommost peripheral cells, is interconnected within the structure in the following manner: the multiplicand output delayed by two cycles is connected to the multiplicand input of the below-adjacent cell. The multiplier output delayed by one cycle is connected to the left-adjacent cell's multiplier input. The modular correction output delayed by two cycles connects to the modular correction input of the below-adjacent cell. The modular selection output delayed by one cycle is connected to the left-adjacent cell's modular selection input. The generated partial sum output delayed by one cycle is connected to the below-right-adjacent cell's partial sum input. Finally, each of the two carry outputs delayed by one cycle is connected to the corresponding carry inputs of the left-adjacent cell.

Rightmost, least-significant cell 2 connections for the multiplicand and modular correction outputs are identical to the above description for the inner cells. However, the partial sum output connections differ. The partial sum output is connected to the modular selection input of the below-adjacent cell. The multiplier input of each rightmost cell is supplied externally in the form of a serial, lesser-significance-to-greater-significance stream. Both carry inputs are connected to ground.

Leftmost, most-significant cell 3 connections for the multiplicand, modular correction, and partial sum outputs are identical to the inner cell description. The single carry output is connected to the partial sum input of the below-adjacent cell.

In the bottommost row 4, modular selection and multiplier outputs are connected identically to the aforementioned inner cell description. The modular correction output is delayed by H+2 clock cycles and is recirculated to the PRI input of the multiplexed delay element in the topmost row, whose output is connected to the modular correction input of the topmost cell residing in the same column. The SEC input of the same multiplexed delay input is connected externally for provision of initial modular correction data. H is a fixed parameter for the entire array structure and is chosen to be an integer value such that $1 \leq H \leq K-2$ The multiplicand output is delayed by H+2 clock cycles and is recirculated to the PRI input of the multiplexed delay element in the topmost row, whose output is connected to the multiplicand input of the topmost cell residing in the same column. The SEC input of the same multiplexed delay input is connected externally for provision of initial multiplicand data. The partial sum output delayed by H+1 delays is recirculated to the multiplexed delay element associated with the right-adjacent cell in the topmost array, whose output is connected to the partial sum input of the same cell. The partial sum output is also provided externally at the bottommost row as the overall array output. Note that the recirculated modular correction, multiplicand, and partial sum signals may be physically routed through the intervening cells of the array, with the H or H−1 delays being distributed as evenly as possible among the cell interconnections involved. While this description is operationally equivalent to the former description in terms of processing behavior, it assists in increasing the achievable clock rate in the physical integrated circuit. For instance, when H=K−2 is chosen, the partial sum output of a cell in the bottom row is delayed by one cycle and routed to a pass-through input in the above-right-adjacent cell. The signal is then output and delayed by one clock cycle and is connected to the above-adjacent cell. The latter process is repeated until the topmost cell is reached. Therefore, one delay element exists prior to each inter-cell excursion within the array, thus guaranteeing minimal interconnect lengths and maximum clock rate. In the same way, the modular correction and multiplicand signal outputs of the cell in the bottommost row are recirculated such that at least one delay element exists prior to each inter-cell excursion.

Each cell performs a computation which, for the purposes of illustration, may be decomposed into the following sequence of bit-wise operations. The multiplicand input bit is ANDed with the multiplier input bit. Similarly, the modular correction input bit is ANDed with the modular selection input bit. The outputs of the two aforementioned computations are added with the partial sum input and the two carry inputs. The least significant bit of the latter sum is connected to the cell's partial sum output, while the two bits generated in the most significant position are connected to the two carry outputs. The multiplicand, modular correction, multiplier, and modular selection inputs are also passed to the multiplicand, modular correction, multiplier, and modular selection outputs, respectively. Within each rightmost cell, all aspects of the above description remain valid except that only a single bit in the most significant position is generated. Thus, each rightmost cell possesses a single carry output.

Delay elements 6, have one input, and delay the input signal by a specified number of clock cycles before presenting the resultant signal at the single output.

The multiplexed delay element 5 takes in two data inputs, labeled PRI and SEC. An additional input SEL is used to multiplex data at the PRI and SEC inputs to the input of a delay register. De-assertion of the SEL input selects the PRI input, while assertion selects the SEC input. The output of the delay register constitutes the output of the multiplexed delay element.

A counter 7 asserts the signal PASS_DATA 8 for 2K+H clock cycles every $(2K+H)*[(N+2)/K]$ clock cycles, where [ARGUMENT] denotes the next highest integer when the ARGUMENT is not an integer, otherwise [ARGUMENT]= ARGUMENT. The signal PASS_DATA is connected to the SEL input of the multiplexed delay element associated with the rightmost cell in the topmost row. De-assertion of the PASS_DATA signal selects the PRI input to the multiplexed delay element, whereas assertion selects the SEC input. The PASS_DATA signal is delayed by one clock cycle and passed to the left-adjacent cell where it is input to the SEL input of the associated multiplexed delay element. Once again, the signal is also again delayed by one clock cycle and passed to the left-adjacent cell. This procedure is repeated until the leftmost cell is reached.

Initial data is supplied externally to the unit such that 2K+H new independent data sets commence processing in sequence every $(2K+H)*[(N+2)/K]$ clock cycles. Multiplicand and modular correction data bits are entered into the cells of the topmost row in the following manner. The rightmost cell receives the least significant modular correction, multiplicand and multiplier bits associated with the first of the 2K+H data streams upon the first clock cycle wherein PASS_DATA is asserted. Upon the next clock cycle, the least significant modular correction, multiplicand and multiplier bits associated with the second of 2K+H currently entering data streams are received. In each of the subsequent 2K+H−2 cycles, the rightmost cell successively receives the remaining 2K+H−2 least significant bits of each input type. An identical process commences for the next-to-least significant modular correction and multiplicand inputs in the left-adjacent cell in the second clock cycle wherein PASS_DATA is asserted. Similarly, the delivery of the first of 2K+H bits corresponding to column J significance is provided J cycles after the initial assertion of PASS_DATA. After 2K+H bits have been successively received by the first cell of each column, no more modular correction or multiplicand initial data is taken in until the next assertion of PASS_DATA renew the above procedure. As mentioned above, the rightmost cell of the topmost row begins successively accepting the least significant bits of the multiplier input data upon the assertion of PASS_DATA. After 2K+H clock cycles. the bit position K of the multiplier input data begins to arrive and is received for the remaining data streams for the next 2K+H cycles. In general, for a rightmost cell in row R where $0 \leq R \leq K-1$, clock cycle $C*(2K+H)+2R$ marks the beginning of the multiplier input bit position $C*K+R$ where C is an arbitrary integer such that $0 \leq C \leq [(N+1)/K]$.

An illustration of the modular multiplier array for the K=3, H=1, N=3 case is shown in FIG. 1. Arrays for other parameterizations should be evident to an individual in the field with a grasp of the above description.

What is claimed is:

1. A machine for processing digital data which performs modular multiplication, comprising:
   (a) input lines, transferring a plurality of data comprising:
      (1) modular residue words of size N bits, and
      (2) multiplicand data words of size N+1 bits, and
      (3) multiplier data words of size N+1 bits, and
   (b) output lines which transfer modular product words of size N+1 bits, and
   (c) a counter which asserts the output PASS_DATA signal for a duration of 2K+H clock cycles every [(N+2)/K] clock cycles and otherwise de-asserts the signal, and
   (d) K rows of processing cells comprising:
      (1) delay elements which transfer an input bit presented during the current clock cycle to the output upon the subsequent clock cycle, and
      (2) multiplexed delay elements which transfer the primary input presented during the current clock cycle to the output during the next clock cycle when the select input is de-asserted, and transfer the secondary input presented during the current clock cycle to the output during the next clock cycle when the select input is asserted, and
      (3) a plurality of inner cells, numbering (K−2)*(N−1) and populating rows 2 through K−1 and columns 2 through N, each of which:
         (a) computes the binary sum of the multiplicand input bit ANDed with the multiplier input bit, the modular correction input bit ANDed with the modular selection input bit, the partial sum input bit, and the two carry input bits, and
         (b) transfers the least significant bit of the said binary sum to the partial sum output bit, and
         (c) transfers the two most significant bits of the said binary sum to the two carry output bits, and
         (d) transfers the said multiplicand input, said multiplier input, said modular correction input, and said modular selection input bits to the multiplicand output, multiplier output, modular correction output, and modular selection output bits, respectively, and
         (e) is connected such that the said multiplicand output is transferred to the input of a cascade of two delay elements whose output is connected to the multiplicand input of the below-adjacent cell, and
         (f) is connected such that the said modular correction output is transferred to the input of a cascade of two delay elements whose output is connected to the modular correction input of the below-adjacent cell, and
         (g) is connected such that the said modular selection output and said multiplier outputs are each transferred to a said delay element whose output is connected to the said modular selection input and said multiplier input, respectively, of the left-adjacent cell, and
         (h) is connected such that the said two carry outputs are each transferred to a said delay element whose output is connected to the respective carry input of the left-adjacent cell, and
         (i) is connected such that the said partial sum output is transferred to a said delay element whose output is connected to the said partial sum input of the below-right-adjacent cell, and
      (4) a plurality of least significant inner cells, numbering K−2 and populating rows 2 through K−1 and column 1, each of which:
         (a) computes the binary sum of the multiplicand input bit ANDed with the multiplier input bit, the modular correction input bit ANDed with the modular selection input bit, and the partial sum input bit, and
         (b) transfers the least significant bit of the said binary sum to the partial sum output bit, and
         (c) transfers the two most significant bits of the said binary sum to the two carry output bits, and
         (d) transfers the said multiplicand input, said multiplier input, said modular correction input, and said modular selection input bits to the multiplicand output, multiplier output, modular correction output, and modular selection output bits, respectively, and
         (e) is connected such that the said multiplicand output is transferred to the input of a cascade of two delay elements whose output is connected to the multiplicand input of the below-adjacent cell, and
         (f) is connected such that the said modular correction output is transferred to the input of a cascade of two delay elements whose output is connected to the modular correction input of the below-adjacent cell, and
         (g) is connected such that the said modular selection output and said multiplier outputs are each transferred to a said delay element whose output is connected to the said modular selection input and said multiplier input, respectively, of the left-adjacent cell, and
         (h) is connected such that the said two carry outputs are each transferred to a said delay element whose output is connected to the respective carry input of the left-adjacent cell, and
         (i) is connected such that the said partial sum output is transferred to a cascade of two delay elements whose output is connected to the modular selection input of the below-adjacent cell, and
         (j) is connected such that the said cell multiplier input is connected to the externally-supplied multiplier input of the same row (5) a plurality of most-significant inner cells, numbering K−2 and populating rows 2 through K−1 and column N+1, each of which:
  (a) computes the binary sum of the multiplicand input bit ANDed with the multiplier input bit, the partial sum input bit, and the two carry input bits, and
  (b) transfers the least significant bit of the said binary sum to the partial sum output bit, and
  (c) transfers the most significant bit of the said binary sum to the carry output bit, and
  (d) transfers the said multiplicand input, said multiplier input, and said modular selection input bits to the multiplicand output, multiplier output, and modular selection output bits, respectively, and
  (e) is connected such that the said multiplicand output is transferred to the input of a cascade of two delay elements whose output is connected to the multiplicand input of the below-adjacent cell, and
  (f) is connected such that the said carry output is transferred to a said cascade of two delay elements whose output is connected to the partial sum input of the below-adjacent cell, and
  (g) is connected such that the said partial sum output is transferred to a delay element whose output is connected to the partial sum input of the below-right-adjacent cell, and
(6) a plurality of bottom-most inner cells, numbering N−1 and populating row K and columns 2 through N, each of which:
  (a) computes the binary sum of the multiplicand input bit ANDed with the multiplier input bit, the modular correction input bit ANDed with the modular selection input bit, the partial sum input bit, and the two carry input bits, and
  (b) transfers the least significant bit of the said binary sum to the partial sum output bit, and
  (c) transfers the two most significant bits of the said binary sum to the two carry output bits, and
  (d) transfers the said multiplicand input, said multiplier input, said modular correction input, and said modular selection input bits to the multiplicand output, multiplier output, modular correction output, and modular selection output bits, respectively, and
  (e) is connected such that the said multiplicand output is transferred to the input of a cascade of H+2 delay elements whose output is connected to the primary input of a said multiplexed dual delay element which:
    (1) is connected such that its output is connected to the multiplicand input of the top-most cell in the same column as the present cell, and
    (2) is connected such that the externally supplied multiplicand input bit of the same column is supplied to the secondary input, and
    (3) is connected such that the select input is connected to the output of a delay element whose input is the select input of the corresponding multiplexed dual delay element of the right-adjacent cell, and
  (f) is connected such that the said modular correction output is transferred to the input of a cascade of H+2 delay elements whose output is connected to the primary input of a said multiplexed dual delay element which:
    (1) is connected such that its output is connected to the modular correction input of the top-most cell in the same column as the present cell, and
    (2) is connected such that the externally supplied modular correction input bit of the same column is supplied to the secondary input, and
    (3) is connected such that the select input is connected to the output of a delay element whose input is the select input of the corresponding multiplexed dual delay element of the right-adjacent column, and
  (g) is connected such that the said modular selection output and said multiplier outputs are each transferred to a said delay element whose output is connected to the said modular selection input and said multiplier input, respectively, of the left-adjacent cell, and
  (h) is connected such that the said two carry outputs are each transferred to a said delay element whose output is connected to the respective carry input of the left-adjacent cell, and
    (1) is connected such that the said partial sum output is transferred to the modular product output bit in the same column and to the input of a cascade of H+1 delay elements whose output is connected to the partial sum input of the right-adjacent cell in the top-most column, and
(7) a least significant bottom-most cell in row K and column 1 which:
  (a) computes the binary sum of the multiplicand input bit ANDed with the multiplier input bit, the modular correction input bit ANDed with the modular selection input bit, and the partial sum input bit, and
  (b) transfers the least significant bit of the said binary sum to the partial sum output bit, and
  (c) transfers the two most significant bits of the said binary sum to the two carry output bits, and
  (d) transfers the said multiplicand input, said multiplier input, said modular correction input, and said modular selection input bits to the multiplicand output, multiplier output, modular correction output, and modular selection output bits, respectively, and
  (e) is connected such that the said multiplicand output is transferred to the input of a cascade of H+2 delay elements whose output is connected to the primary input of a said multiplexed dual delay element which:
    (1) is connected such that its output is connected to the multiplicand input of the top-most cell in the same column as the present cell, and
    (2) is connected such that the externally supplied multiplicand input bit of the same column is supplied to the secondary input, and
    (3) is connected such that the select input is connected to the PASS_DATA signal provided by the counter, and
  (f) is connected such that the said modular correction output is transferred to the input of a cascade of H+2 delay elements whose output is connected to the primary input of a said multiplexed dual delay element whose output is connected to the primary input of a said multiplexed dual delay element which:
    (1) is connected such that its output is connected to the modular correction input of the top-most cell in the same column as the present cell, and
    (2) is connected such that the externally supplied modular correction input bit of the same column is supplied to the secondary input, and (3) is connected such that the select input is connected to the to the PASS_DATA signal provided by the counter, and (g) is connected such that the said modular selection output and said multiplier outputs are each transferred to a said delay element whose output is connected to the said modular selection input and said multiplier input, respectively, of the left-adjacent cell, and (h) is connected such that the said two carry outputs are each transferred to a said delay element whose output is connected to the respective carry input of the left-adjacent cell, and (i) is connected such that the said partial sum output is transferred to the modular product output bit in the same column, and (j) is connected such that the said multiplier input associated with the cell is connected to the externally-supplied multiplier input of the same row (8) a most-significant bottom-most cell in row K and column N+1 which:

(a) computes the binary sum of the multiplicand input bit ANDed with the multiplier input bit, the partial sum input bit, and the two carry input bits, and (b) transfers the least significant bit of the said binary sum to the partial sum output bit, and (c) transfers the most significant bit of the said binary sum to the carry output bit, and (d) transfers the said multiplicand input, said multiplier input, and said modular selection input bits to the multiplicand output, multiplier output, and modular selection output bits, respectively, and (e) is connected such that the said multiplicand output is transferred to the input of a cascade of H+2 delay elements whose output is connected to the primary input of a said multiplexed dual delay element whose output is connected to the primary input of a said multiplexed dual delay element which:

(1) is connected such that its output is connected to the multiplicand input of the top-most cell in the same column as the present cell, and (2) is connected such that the externally supplied multiplicand input bit of the same column is supplied to the secondary input, and (3) is connected such that the select input is connected to the output of a delay element whose input is the select input of the corresponding multiplexed dual delay element of the right-adjacent column, and (f) is connected such that the said carry output is transferred to the input of a cascade of H+2 delay elements whose output is connected to the primary input of a said multiplexed dual delay element whose output is connected to the partial sum input of the top-most cell in the same column, and (g) is connected such that the said partial sum output is transferred to the modular product output bit in the same column and to the input of a cascade of H+1 delay elements whose output is connected to the partial sum input of the top-most cell in the right-adjacent column, whereby said multiplicand datum and said multiplier datum are multiplied modulo the modulus corresponding to said modular residue datum for each of 2K+H data sets.

\* \* \* \* \*